Figure 1:
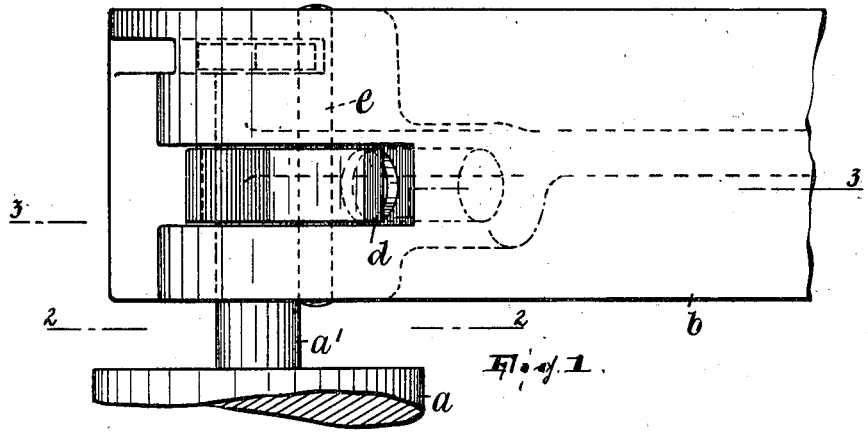

F. HINNEKENS.
BEARING.
APPLICATION FILED JAN. 28, 1921.

1,379,818.

Patented May 31, 1921.

WITNESS
Wm L Bell.

INVENTOR,
Florent Hinnekens,
BY
ATTORNEY.

UNITED STATES PATENT OFFICE.

FLORENT HINNEKENS, OF PATERSON, NEW JERSEY.

BEARING.

1,379,818.     Specification of Letters Patent.     Patented May 31, 1921.

Application filed January 28, 1921. Serial No. 440,556.

*To all whom it may concern:*

Be it known that I, FLORENT HINNEKENS, a citizen of the United States, residing at Paterson, in the county of Passaic and State of New Jersey, have invented certain new and useful Improvements in Bearings, of which the following is a specification.

This invention relates to bearings for rotary parts, such as the rolls or cylinders for fabric and other material wound up on the same, which have to be frequently placed in and removed from the bearings and are rotated at a more or less high speed. The principal object is to provide a bearing structure that will prevent the rotary part from jumping from its bearings, as in the case where it forms the core of a wound package that rotates at more or less high speed under the draft of the wound material in being delivered or unwound, and that will also permit said part to be readily removed and replaced by the attendant.

In the drawings,

Figure 1 is a plan view of the improved bearing; and

Figure 2:
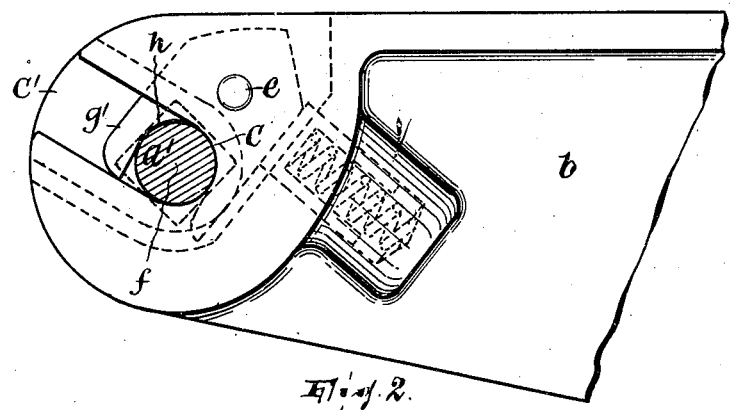
Figure 3:
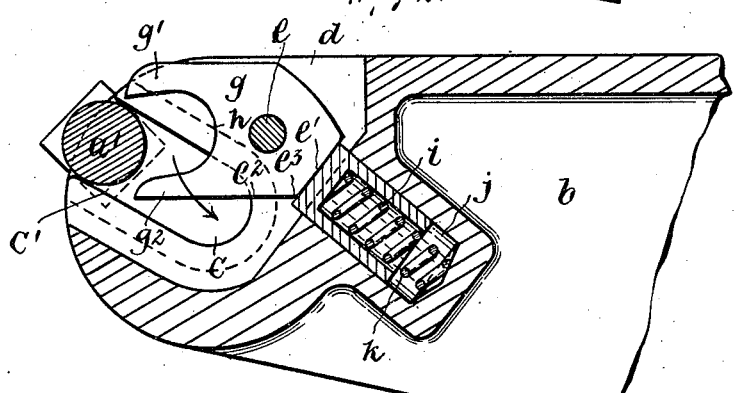

Figs. 2 and 3 are sectional views on the lines 2—2 and 3—3 of Fig. 1.

$a$ designates the part to be journaled, being here shown as a roller to form the core of a wound fabric bolt or other package. $b$ indicates one of two bearing members for the gudgeons $a'$ of the roll $a$. The member $b$ has a bearing $c$ which is open or provided with an entrance $c'$ lateral of the bearing axis, $c\ c'$ being in the present case a groove which is pitched or inclined with its open end uppermost. As explained, when the roll is supported in a pair of such bearings it tends to remain therein, but when rotated at more or less high speed under the draft of the fabric in unwinding it occasionally works out of the bearings. To prevent this I provide the bearing member with a roll retaining means constructed, for example, as illustrated in the drawing.

The bearing member is formed with a vertical narrow recess $d$ which extends from above the groove $c\ c'$ to a point suitably below the same. On a pin $e$ offset from the bearing axis, indicated at $f$, is pivoted a keeper member $g$ which is crotched, as at $h$, its crotch being so formed that when the keeper member is in the position shown in Fig. 2, with the gudgeon $a'$ positioned in the bearing, its crotch straddles the gudgeon and hence the bearing axis, approximately fitting the gudgeon. The keeper $g$ occupies the recess $d$.

In the position of the keeper member last referred to, the arm or portion $g'$ thereof between the gudgeon and the entrance $c'$ to the bearing will serve to hold the gudgeon from becoming unshipped from the bearing if the keeper member is held against movement on its pivot. Hence I provide the keeper member with two faces, $e'$, $e^2$, preferably flat, and arranged at an angle with each other so as to form a hump $e^3$ on the periphery of the keeper member; and in the bearing member $a$ I house spring means to bear against either of said faces and which on account of the hump will oppose resistance to pivotal movement of the keeper member, this spring means in the present case being a hollow plunger $i$ set in a bore $j$ in the bearing member and a helical spring $k$ abutting the closed end of the bore and the outer (closed) end of a bore formed in the plunger.

On account of resistance opposed by the spring means the gudgeon is held by the keeper against escape from the bearing with the parts in the position shown in Fig. 2. But when the roll has to be removed the operator can effect its removal by application of a quick strong pull on the roll in the direction of the entrance $c'$ to the bearing, the effect of which is to shift the keeper member $g$ to a position where the opening of its crotch faces toward said entrance, in which position the keeper member will then be retained by the spring means (see Fig. 3). Face $e'$ of the keeper is so positioned that when the keeper is thus held by the spring means the portion or arm $g^2$ thereof which is relatively inward of the crotch extends obliquely more or less across the groove $c\ c'$, so that when the roll is returned to the bearing the gudgeon $a'$ will by engaging this arm and upon the application of suitable pressure force the keeper back to the position shown in Fig. 2. The return of the keeper to locking position is thus incident to the return of the roll to the bearing and caused by the roll.

Having thus fully described my invention, what I claim as new and desire to secure by Letters Patent is:—

1. The combination of a bearing member having a bearing formed with an entrance thereto relatively lateral of the bearing axis, a crotched keeper movable on a pivot offset from said axis from a position where its crotch straddles said axis and opens in angular relation to the bearing entrance, thus to retain in the bearing the part to be journaled, into a position where its crotch faces toward said entrance, whereby to release said part, and spring means yieldingly resisting movement of the keeper from one of said positions to the other.

2. The combination of a bearing member having a bearing formed with an entrance thereto relatively lateral of the bearing axis, a crotched keeper straddling said axis and having its crotch open in angular relation to the bearing entrance, being thereby adapted to retain the part to be journaled in said bearing, and being movable on a pivot offset from said axis to bring the opening to the crotch into position to face toward said entrance, whereby to release said part, said keeper having a hump, and spring means bearing against the keeper and adapted to be tensioned by said hump when the keeper is moved from one to the other of said positions.

3. The combination of a bearing member having a bearing formed with an entrance thereto relatively lateral of the bearing axis, a crotched keeper movable from a position where its crotch straddles said axis and opens in angular relation to the bearing entrance, thus to retain in the bearing the part to be journaled, into a position where its crotch faces toward said entrance, whereby to release said part, and spring means yieldingly resisting movement of the keeper from one of said positions to the other.

In testimony whereof I affix my signature.

FLORENT HINNEKENS.